United States Patent
Tsai et al.

(10) Patent No.: US 7,273,283 B2
(45) Date of Patent: Sep. 25, 2007

(54) METHOD AND APPARATUS FOR AN ANTI-MELT PROJECTION LENS CAP

(75) Inventors: Wen-Wei Tsai, Miao-Li County (TW); Chi-Neng Tseng, Miao-Li County (TW); Cheng-Kuei Chen, Miao-Li County (TW); Chih-Kun Yang, Miao-Li County (TW)

(73) Assignee: Coretronic Corporation, Miao-Li County (TW)

( * ) Notice: Subject to any disclaimer, the term of this patent is extended or adjusted under 35 U.S.C. 154(b) by 191 days.

(21) Appl. No.: 11/030,118

(22) Filed: Jan. 7, 2005

(65) Prior Publication Data
US 2005/0151933 A1    Jul. 14, 2005

(30) Foreign Application Priority Data
Jan. 9, 2004    (TW) ............................. 93100628 A

(51) Int. Cl.
G03B 21/14    (2006.01)
G03B 21/16    (2006.01)

(52) U.S. Cl. .......................................... 353/52; 353/97
(58) Field of Classification Search ................. 353/52, 353/57, 85, 97, 119, 121
See application file for complete search history.

(56) References Cited

U.S. PATENT DOCUMENTS

| | | | |
|---|---|---|---|
| 5,815,316 A * | 9/1998 | Friedman et al. | 359/511 |
| 6,570,621 B2 * | 5/2003 | Bigler et al. | 348/372 |
| 6,827,453 B2 * | 12/2004 | D'Alessio et al. | 353/85 |
| 2004/0196442 A1 | 10/2004 | D'Alessio et al. | |
| 2005/0041222 A1 * | 2/2005 | Haba | 353/119 |
| 2005/0151933 A1 | 7/2005 | Tsai et al. | |

FOREIGN PATENT DOCUMENTS

| | | |
|---|---|---|
| JP | 2000112029 | 4/2000 |
| JP | 2004245986 | 9/2004 |
| KR | 2003017049 | 3/2003 |
| KR | 2002057731 | 8/2003 |

* cited by examiner

Primary Examiner—Rodney Fuller
(74) Attorney, Agent, or Firm—MH2 Technology Law Group

(57) ABSTRACT

A method and apparatus for an anti-melt projection lens cap includes a sensor that detects whether the projection lens cap covers the projection lens and transmits a detected signal to the control unit including two control modes. The first one is projecting a dark image immediately, as the projection lens cap covers the projection lens for longer than a first set time, the control unit switches to a power-saving mode, when it lasts longer than a second set time, the lamp and the system power supply are turned off, then, a fan cools the lamp, the control unit switches to a standby mode. The second one is switching to the power-saving mode directly, when it lasts longer than a second set time, the lamp and the system power supply are turned off, and a fan cools the lamp, then, the control unit switches to the standby mode.

4 Claims, 9 Drawing Sheets

METHOD AND APPARATUS FOR AN ANTI-MELT PROJECTION LENS CAP

FIELD OF THE INVENTION

The present invention relates to a projection display device, and more particularly to a method and apparatus for an anti-melt projection lens cap applied in a projection display device.

BACKGROUND OF THE INVENTION

Generally, a projection display device lens is dust-proof and sheltered from light or protected from impact mainly by means of a projection lens cap. Sometimes when a user wants to pause the projection of the projection display device and proceeds with other illustration or to write, meanwhile, without switching on the projection display device so frequently that the lifetime thereof will be shortened, a projection lens cap is used to cover the projection lens for intercepting the projection temporarily. At the same time, because the projection display device is still at a projecting mode, the light beam with great heat projected from the projection lens keeps being projected on the projection lens cap and results in heat accumulated on the projection lens cap, which causes the projection lens cap made of plastic material to melt. Please refer to FIG. 1, which shows a conventional projection display device 10. The light beam with great heat is reflected back to the projection lens 11 mainly by pasting a light-reflecting sheet or a metal blocking sheet on one side of the projection lens cap 12 opposite to the projection lens 11. However, even though the problem of heat accumulated on the projection lens cap 12 is solved, heat accumulates on the projection lens 11 instead and damages the projection lens 11, which causes the quality of images projected from the projection lens 11 to be lowered. Another conventional way is to select a plastic material with a high heat-resistant coefficient to make the projection lens cap 12, however, this not only increases the cost but also needs to select a plastic material with a different heat-resistant coefficient again with the increase of brightness, which is quite inconvenient.

SUMMARY OF THE INVENTION

One object of the present invention is to provide a method and apparatus for an anti-melt projection lens cap, wherein a sensor is disposed to transmit a detected signal to a control unit, and a projection display device is controlled to switch from a projecting mode comprising light beam with great heat to a dark-image mode, in order to prevent the light beam with great heat from being projected on the projection lens cap, and to prevent the projection lens cap from melting.

Another object of the present invention is to provide a method and apparatus for an anti-melt projection lens cap, wherein a sensor is disposed to detect the time when a projection lens cap covers a projection lens, and a projection display device is controlled to switch from a projecting mode to a power-saving mode or a standby mode in time by means of a control unit, in order to save electric power.

For attaining the objectives mentioned above, a method and apparatus for an anti-melt projection lens cap according to the present invention mainly includes a projection lens, a projection lens cap, a sensor and a control module. First, the sensor detects whether the projection lens cap covers the projection lens, and transmits a detected signal to the control unit. The control unit includes two control modes. The first control mode is to project a dark image immediately, and as the projection lens cap covers the projection lens for longer than a first set time, the control unit switches to a power-saving mode, and, as the time of the power-saving mode is longer than a second set time, the lamp and the system power supply is turned off, and then the lamp is cooled by a fan, and the control unit switches to a standby mode. The second control mode is to switch to the power-saving mode directly, as the power-saving mode lasts longer than a second set time, the lamp and the power supply of the system is turned off, and the lamp is cooled by a fan, and then the control unit switches to the standby mode, in order to prevent the light beam with great heat from being projected on the projection lens cap, and prevent the projection lens cap from melting, meanwhile, save the electric power.

DETAILED DESCRIPTION OF THE PREFERRED EMBODIMENT

Figure 1:
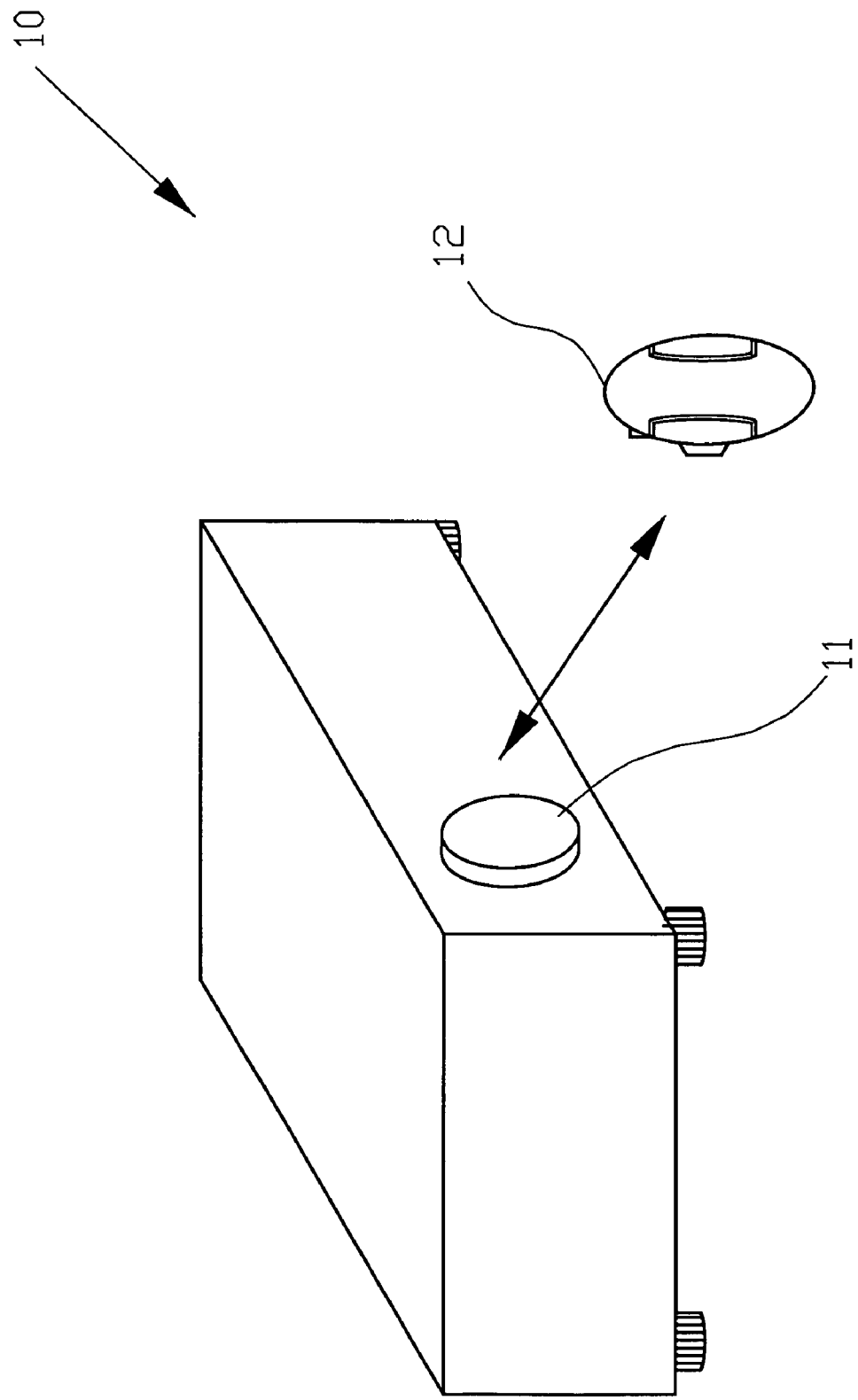
FIG. 1 is a schematic view showing a conventional projection display apparatus.
Figure 2:
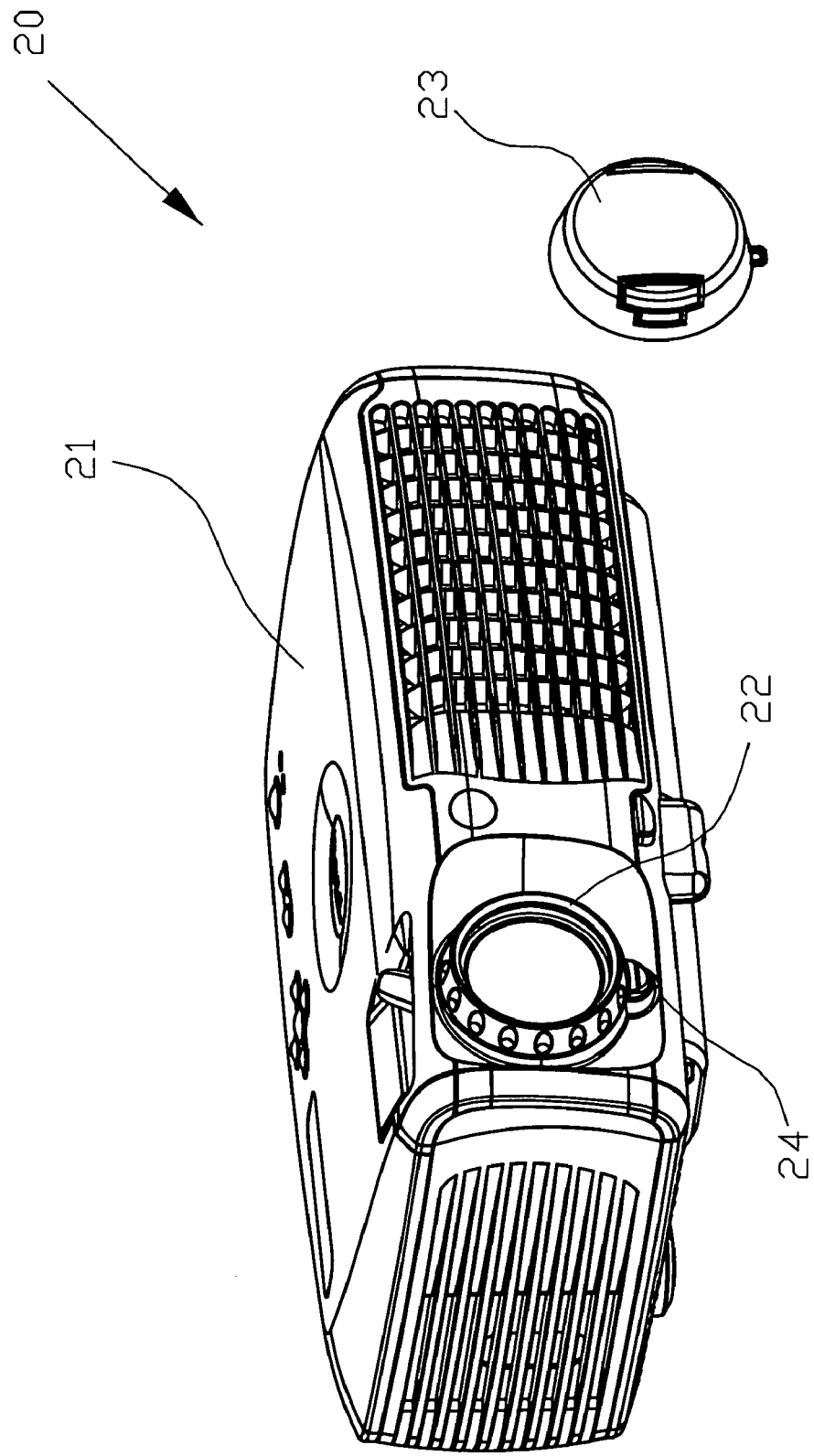
FIG. 2 is a perspective view showing an apparatus of an anti-melt projection lens cap according to a first embodiment of the invention.
Figure 3:
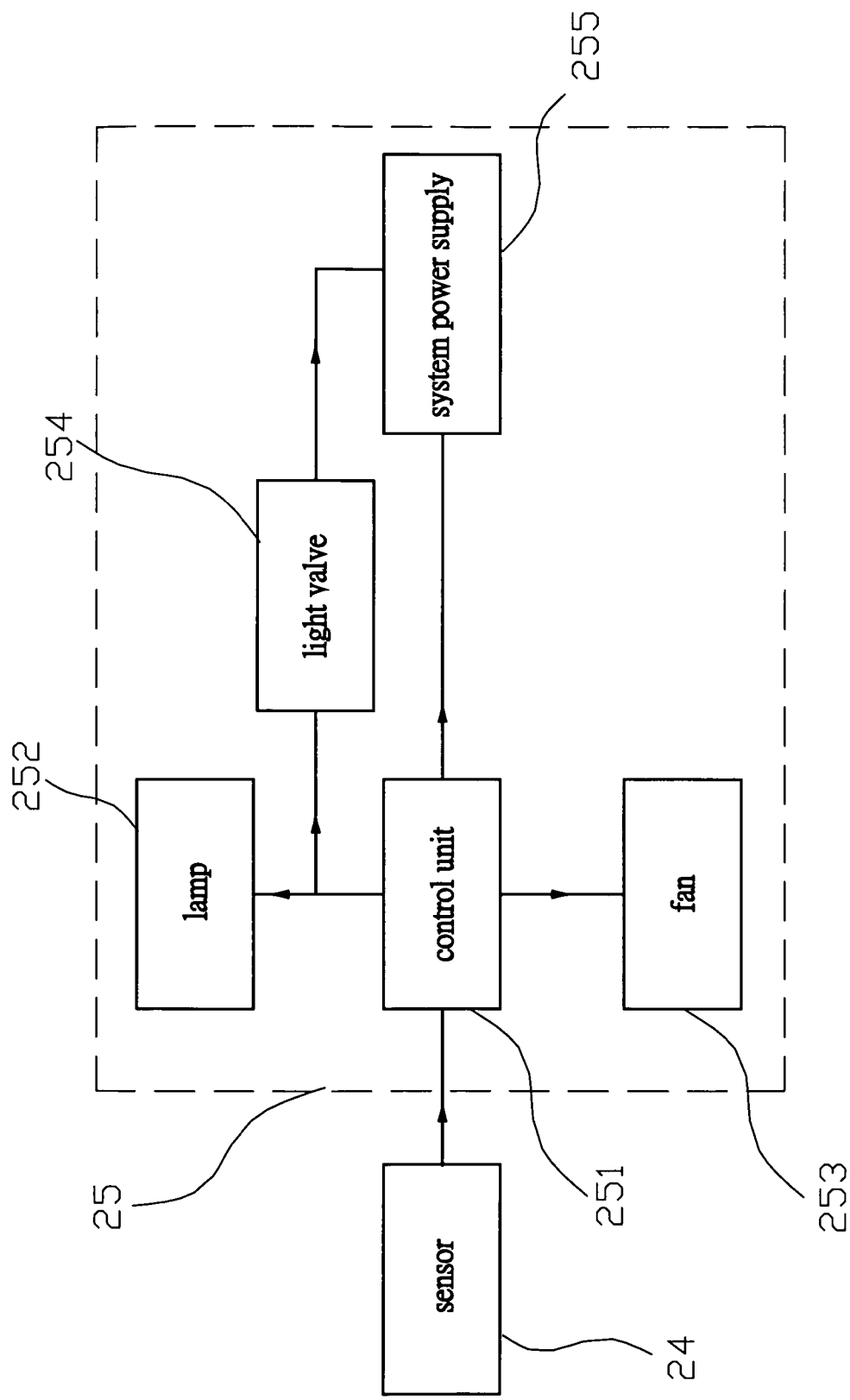
FIG. 3 is a schematic diagram showing components in the apparatus of an anti-melt projection lens cap of the invention.

Please refer to FIG. 2 and FIG. 3. The projection display apparatus 20 in the first embodiment of the invention mainly includes a case 21, a projection lens 22, a projection lens cap 23, a sensor 24 and a control module 25. The projection lens 22 is disposed on the case 21, and the outer rim of the projection lens 22 is sleeved with the projection lens cap 23. The sensor 24 is disposed below the outer rim of the projection lens 22 and can be a touch switch used to detect whether the projection lens cap 23 sleeves the projection lens 22. The control module 25 is disposed in the case 21 and connected with the sensor 24. The control module 25 includes a control unit 251, a lamp 252, a fan 253, a light valve 254, a system power supply 255 and so on. The control unit 251 receives detected signal from the sensor 24, in order to control the operation of the lamp 252, the fan 253, the light valve 254 and the system power supply 255.

Figure 4:
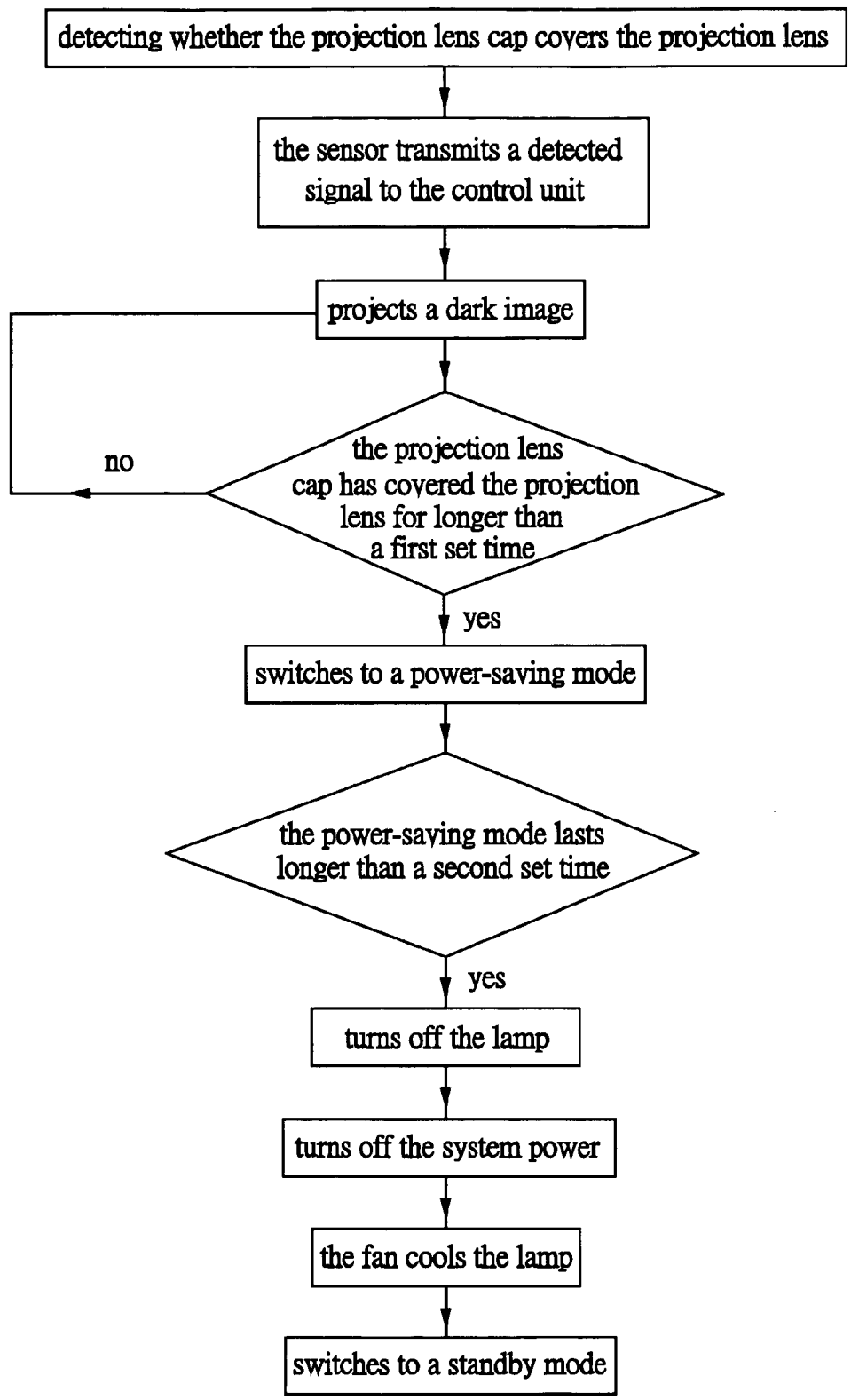
FIG. 4 is a flow chart showing the first control mode in the method of an anti-melt projection lens cap of the invention.

Please refer to FIG. 4. The control unit 251 of the invention has two control modes. The first control mode is that as the projection lens cap 23 covers the projection lens 22, the projection lens cap 23 touches the sensor 24, and the sensor 24 transmits a detected signal to the control unit 251, the control unit 251 controls the light valve 254 to project a dark image. As the projection lens cap 23 has covered the projection lens 22 for longer than a first set time namely 5 seconds, the control unit 251 controls the projection display device 20 to a power-saving mode. Generally, a light beam generates a light flux of 1500 lumen at a normal projecting mode, but only 2 lumen when projecting a dark image. Therefore, the projection lens cap 23 suffers much less heat than at a normal projecting mode. The power-saving mode not only keeps projecting a dark image but also controls the system power supply 255 to output 80% electric power, so as to save the electric power. Besides, as the power-saving mode lasts to a second set time namely 30 minutes, the control unit 251 further turns off the lamp 252 and the system power supply 255, and then, controls the fan 253 to cool the lamp 252, and switches the projection display apparatus 20 from the power-saving mode to a standby mode, wherein the standby mode maintains only 5% electric power that saves more electric power.

Figure 5:
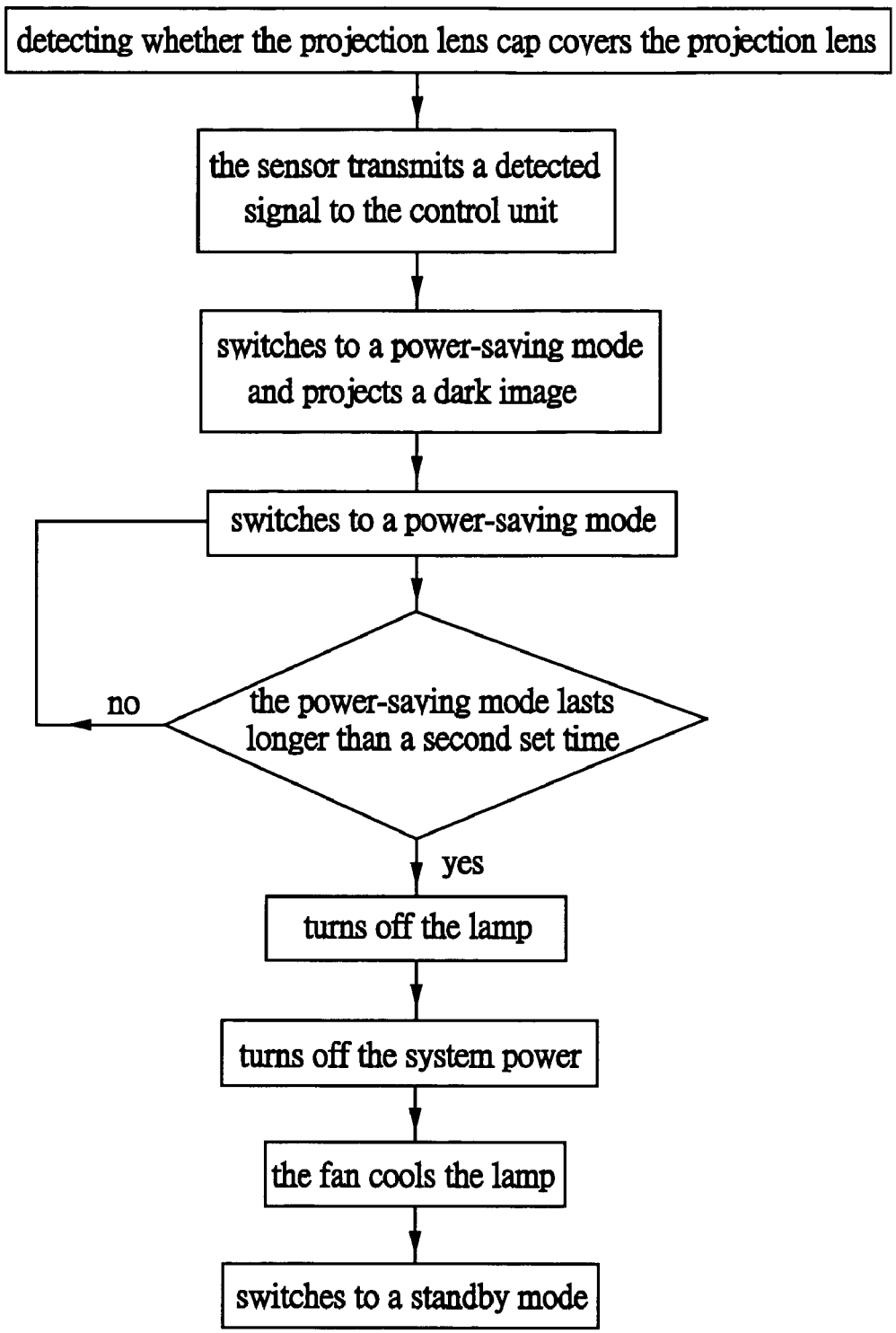
FIG. 5 is a flow chart showing the second control mode in the method of the anti-melt projection lens cap of the invention.

Furthermore, please refer to FIG. 5. The second control mode of the control unit 251 of the invention is to switch to the power-saving mode directly and project a dark image. As the power-saving mode lasts to the second set time namely 30 minutes, the control unit 251 further turns off the lamp 252 and the system power supply 255, and then, controls the fan 253 to cool the lamp 252, and switches the projection display apparatus 20 from the power-saving mode to the standby mode. Therefore, the present invention achieves the objective of preventing the projection lens cap 23 from melting on the condition that the sensor 24 detects whether the projection lens cap 23 covers the projection lens 22 and transmits a detected signal to the control unit 251 in order to control the projection display device 20 to switch from the projecting mode with great heat to the dark-image projecting mode with much less heat, so as to prevent the great heat within the light beam from being projected on the projection lens cap 23. In addition, the control unit 251 controls the projection display apparatus 20 to switch to the power-saving mode or the standby mode as the projection lens cap 23 covers on the projection lens 22, and then attains to the saving of electric power.

Figure 9:
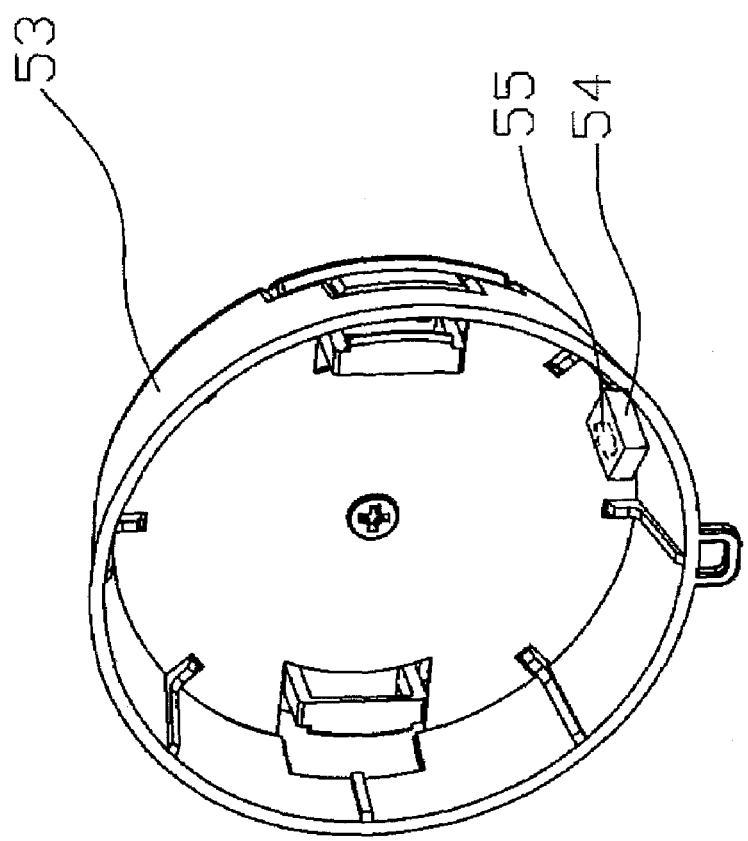
FIG. 9 is a perspective view showing the schematic location of a wireless transmission module inside a heat sensor at a projection lens cap in the fourth embodiment of the invention.

FIG. 9 is a perspective view showing the schematic location of a wireless transmission module inside a heat sensor at a projection lens cap in the fourth embodiment of the invention.

Figure 6:
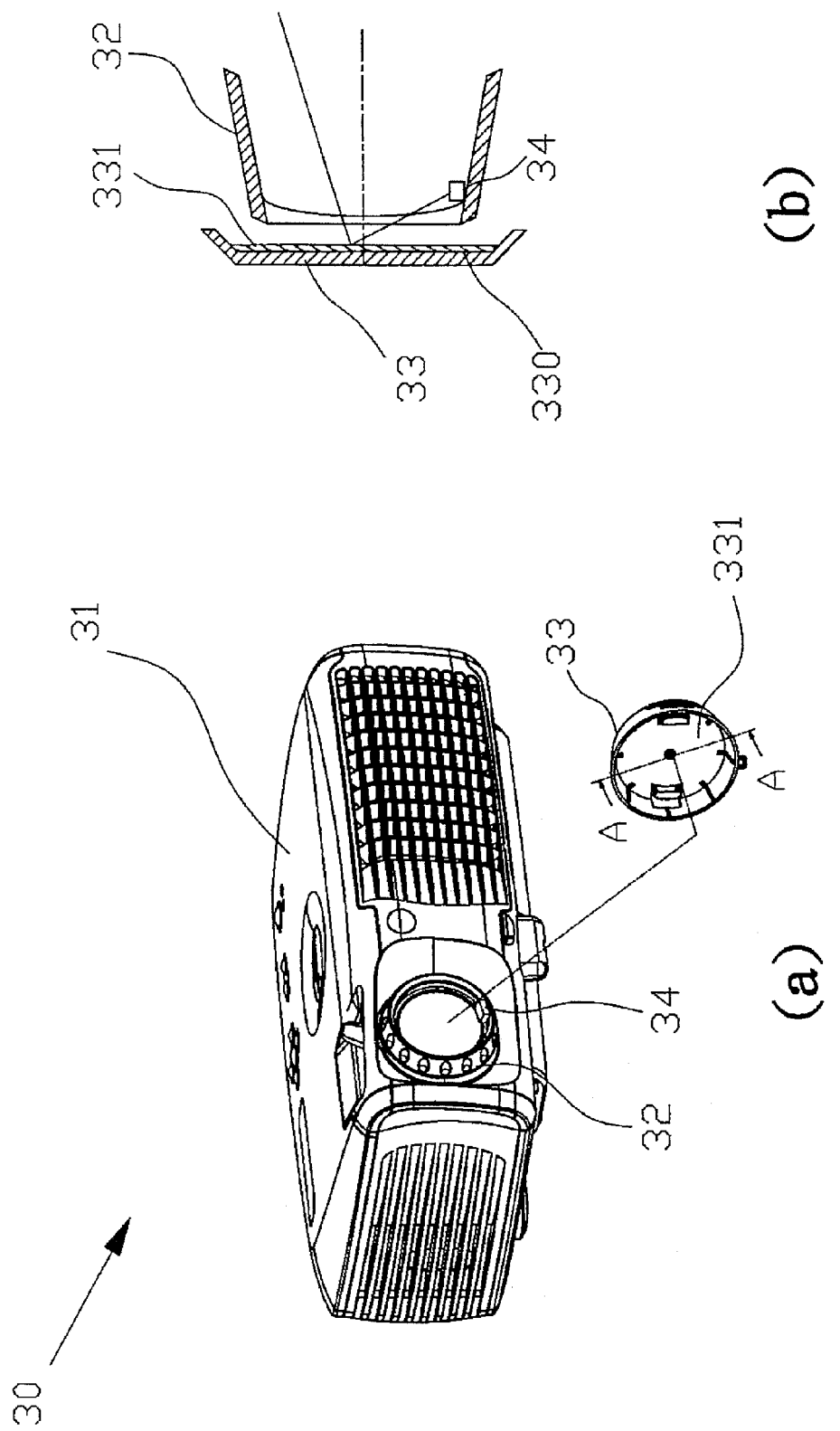
FIG. 6(a) and FIG. 6(b) are exterior views showing an apparatus of an anti-melt projection lens cap in the second embodiment of the invention.

Please refer to FIG. 6, which shows a projection display device 30 in the second embodiment of the invention. Here, the main composition is the same as that of the first embodiment. Projection lens cap 32 includes a surface 330 that faces projection lens 32. The difference is that, a light sensor 34 is disposed below the outer rim of the projection lens 32, and a metal sheet 331 is pasted on surface 330 of the projection lens cap 33 facing the projection lens 32. The material of the metal sheet 331 is a good light-reflecting material, such as aluminum or magnesium and so on. As shown in FIG. 6(b), as the outer rim of the projection lens 32 is sleeved with the projection lens cap 33, the light beam projected from the projection lens 32 is reflected to the light sensor 34 by the metal sheet 331. The light sensor 34 transmits a detected signal to the control unit 251 in order to control the projection display device 30 to switch to the control modes previously mentioned. Thus, the second embodiment of the invention can transmit the detected signal to the control unit 251 immediately as the projection lens cap 33 is still at a distance from the projection lens 32 by means of the light sensor 34, in order to accelerate the switching speed of the projection display device 30. In addition, less heat is accumulated on the projection lens cap 33 and a cooling effect is achieved by reflecting the light beam with great heat by means of the metal sheet 331.

Figure 7:
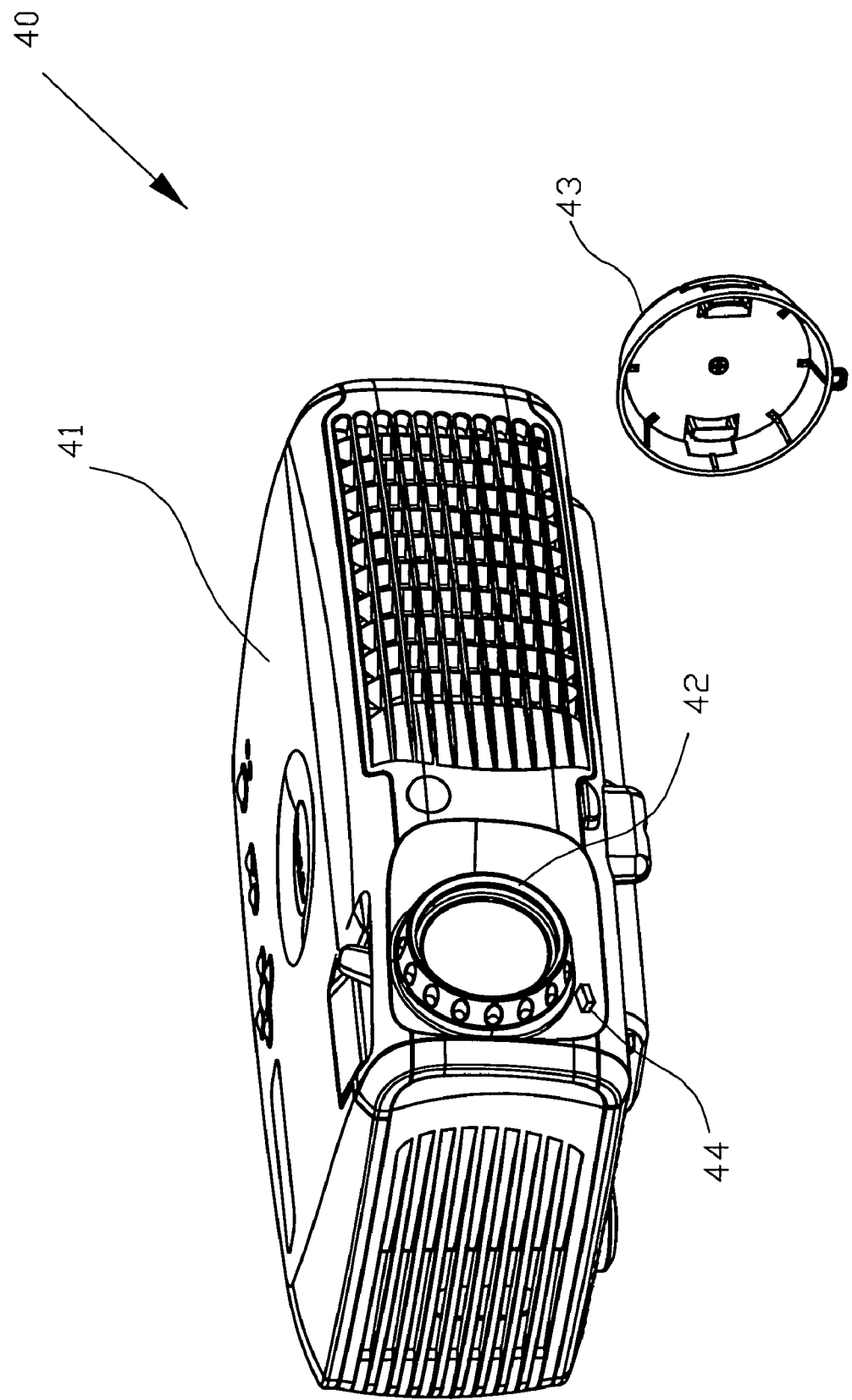
FIG. 7 is a perspective view showing an apparatus of an anti-melt projection lens cap in the third embodiment of the invention.
Figure 8:
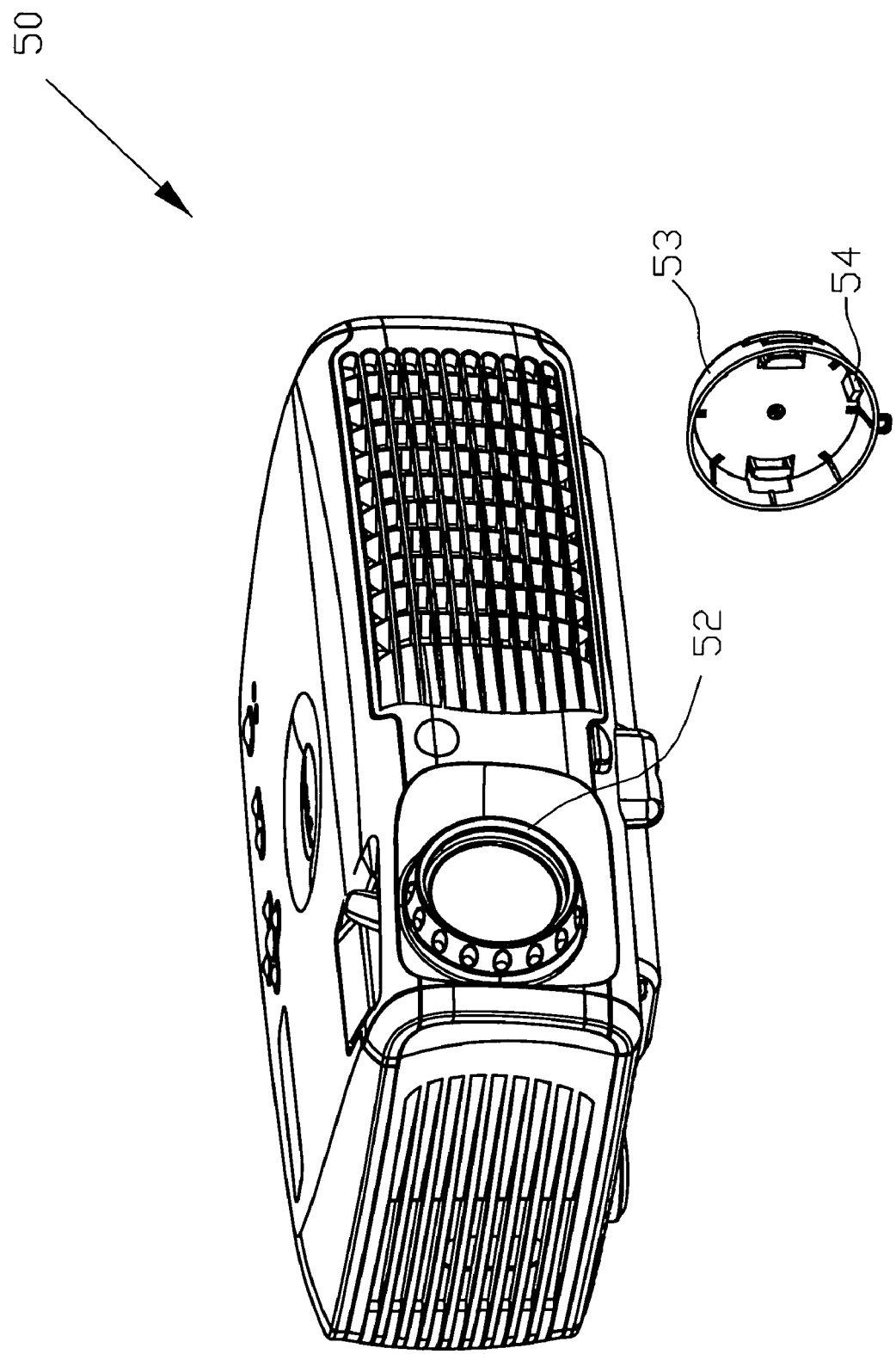
FIG. 8 is a perspective view showing an apparatus of an anti-melt projection lens cap in the fourth embodiment of the invention.

Please continue to refer to FIG. 7, which shows a projection display device 40 in the third embodiment of the invention. In this embodiment, the sensor is a magnetic sensor 44. The locations of the magnetic sensor 44 can be on the inside of the case 41, around the outer rim of the projection lens 42 or the inside rim of the projection lens 42. A detected signal is produced as the outer rim of the projection lens 42 is covered with the projection lens cap 43 so as to make the magnetic sensor 44 sense the magnetism. FIG. 8 shows a projection display device 50 in the fourth embodiment of the invention, wherein a heat sensor 54 is disposed on the projection lens cap 53. As the outer rim of the projection lens 52 is covered with the projection lens cap 53, the light beam is projected on the heat sensor 54 to produce a detected signal. A wireless transmission module 55, as illustrated in FIG. 9, is disposed inside the heat sensor 54 to transmit the detected signal to the control unit 251. Thus, the invention can transmit the detected signal to the control unit 251 rapidly by means of the magnetic sensor 44 or the heat sensor 54, in order to switch the projection display device from the projecting mode to the control modes previously mentioned, so as to prevent the projection lens cap from melting.

While a preferred embodiment of the present invention have been described herein for the purpose of illustration, many modifications and changes will become apparent to those skilled in the art. Accordingly, the appended claims are intended to encompass all such modifications and changes as fall within the true spirit and scope of this invention.

What is claimed is:

1. An apparatus for an anti-melt projection lens cap applied in a projection display device, comprising:
   a projection lens;
   a projection lens cap, covering said projection lens;
   a metal sheet pasted on a surface of said protection lens cap facing said protection lens;
   a light sensor disposed on said projection display device near said projection lens, detecting whether said projection lens cap covers said projection lens; and
   a control module disposed in said projection display device for receiving a detected signal from said sensor, controlling outputted modes.

2. The apparatus for an anti-melt projection lens cap according to claim 1, wherein said control module comprises a control unit, a lamp, a fan, a light valve and a system power supply, and said control unit controls the operation of said lamp, said fan, said light valve and said system power supply.

3. An apparatus for an anti-melt projection lens cap applied in a projection display device, comprising:
   a projection lens;
   a projection lens cap, covering said projection lens;
   a sensor disposed in at least a portion of said lens cap, detecting whether said projection lens cap covers said projection lens;
   a wireless transmission module disposed inside said sensor for transmitting the detected signal; and
   a control module disposed in said projection display device for receiving the detected signal from said wireless transmission module, controlling outputted modes.

4. The apparatus for an anti-melt projection lens cap according to claim 3, wherein said sensor is a heat sensor.

* * * * *